United States Patent
Arimilli et al.

(10) Patent No.: US 6,910,062 B2
(45) Date of Patent: Jun. 21, 2005

(54) METHOD AND APPARATUS FOR TRANSMITTING PACKETS WITHIN A SYMMETRIC MULTIPROCESSOR SYSTEM

(75) Inventors: Ravi Kumar Arimilli, Austin, TX (US); Guy Lynn Guthrie, Austin, TX (US); Jody Bern Joyner, Austin, TX (US); Jerry Don Lewis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 09/918,812

(22) Filed: Jul. 31, 2001

(65) Prior Publication Data

US 2003/0033350 A1 Feb. 13, 2003

(51) Int. Cl.[7] .............................................. G06F 15/16
(52) U.S. Cl. ........................ 709/202; 709/208; 709/251
(58) Field of Search .............................. 709/201, 202, 709/208, 251

(56) References Cited

U.S. PATENT DOCUMENTS

| | | | | |
|---|---|---|---|---|
| 4,949,272 A | * | 8/1990 | Vanourek et al. | 705/410 |
| 4,965,793 A | * | 10/1990 | Polzin et al. | 370/236 |
| 5,613,071 A | * | 3/1997 | Rankin et al. | 707/10 |
| 5,680,571 A | * | 10/1997 | Bauman | 711/122 |
| 5,742,792 A | * | 4/1998 | Yanai et al. | 711/162 |
| 5,887,146 A | * | 3/1999 | Baxter et al. | 710/104 |
| 6,253,292 B1 | * | 6/2001 | Jhang et al. | 711/146 |
| 6,484,224 B1 | * | 11/2002 | Robins et al. | 710/305 |
| 6,606,702 B1 | * | 8/2003 | Guthrie et al. | 712/218 |
| 2002/0087849 A1 | * | 7/2002 | Arimilli et al. | 712/235 |

OTHER PUBLICATIONS

TDB–ACC–NO: NNRD411128. "Non–Blocking Distributed Bus Switch for Multicomputer Systems," Research Disclosure, Jul. 1, 1998, UK. vol. 41, Issue 411.*

Trystram, D; "Scheduling Parallel Applications using Malleable Tasks on Cluster" Parallel and Distributed Processing Symposium., Proceedings 15th International, Apr. 23–27, 2001, pp. 2128–2135.*

Valentino et al.; "An SMP–Based, Low–Latency, Network Interface Unit and Latency Measurement System: The SNAPpy System," Distributed Interactive Simulation and Real–Time Applications, Proceedings. 2nd International Workshop on Jul. 19–20, 1998, p. 62–70.*

* cited by examiner

Primary Examiner—Jack D. Harvey
Assistant Examiner—Michael D. Meucci
(74) Attorney, Agent, or Firm—Casimer K. Salys; Dillon & Yudell LLP (57) ABSTRACT

The symmetric multiprocessor system includes multiple processing nodes, with multiple agents at each node, connected to each other via an interconnect. A request transaction is initiated by a master agent in a master node to all receiving nodes. A write counter number is generated for associating with the request transaction. The master agent then waits for a combined response from the receiving nodes. After the receipt of the combined response, a data packet is sent from the master agent to all intended one of the receiving nodes according to the combined response. After the data packet has been sent, the master agent in the master node is ready to send another request transaction along with a new write counter number, without the necessity of waiting for an acknowledgement from the receiving node.

8 Claims, 5 Drawing Sheets

*(Prior Art)*

Fig. 6

METHOD AND APPARATUS FOR TRANSMITTING PACKETS WITHIN A SYMMETRIC MULTIPROCESSOR SYSTEM

BACKGROUND OF THE INVENTION

1. Technical Field

The present invention relates to data processing systems in general, and in particular to symmetric multiprocessor systems. Still more particularly, the present invention relates to a method and apparatus for transmitting packets among processing nodes within a symmetric multiprocessor system.

2. Description of the Prior Art

It is well-known in the computer arts that greater processing performance can be achieved by harnessing the processing power of multiple individual processors in tandem. Multiprocessor computer systems can be designed with a number of different architectures, of which one may be better suited for a particular application over the others, depending upon the intended design, system performance requirements, and software environment. Known multiprocessor architectures include, for example, symmetric multiprocessor (SNP) system architecture and non-uniform memory access (NUMA) system architecture.

In an SMP data processing system, all of the processing units are generally identical; that is, they all have the same architecture and utilize a common set or subset of instructions and protocols to operate. Typically, each processing unit includes a processor core having at least one execution unit for carrying out program instructions. In addition, each processing unit may include at least one level of caches, commonly referred to as level one (L1) caches, which are typically implemented with high-speed memories. Similarly, a second level of caches, commonly referred to as level two (L2) caches, may also be included in each processing unit for supporting the L1 caches. Sometimes, a third level of caches, commonly referred to as level three (L3) caches, may also be included in each processing unit for supporting the L2 caches. Each level of caches stores a subset of the data and/or instructions contained in a system memory for low-latency accesses by various processor cores.

The present disclosure describes a method and apparatus for transmitting packets among various processing nodes within an SMP system.

SUMMARY OF THE INVENTION

In accordance with a preferred embodiment of the present invention, a data processing system includes multiple processing nodes, with multiple agents at each node, connected to each other via an interconnect. A request transaction is initiated by a master agent in a master node to all receiving nodes. A write counter number is generated for associating with the request transaction. The master agent then waits for a combined response from the receiving nodes. After the receipt of the combined response, a data packet is sent from the master agent to an intended one of the receiving nodes according to the combined response. After the data packet has been sent, the master agent in the master node is ready to send another request transaction along with a new write counter number, without the necessity of waiting for an acknowledgement from the receiving node.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
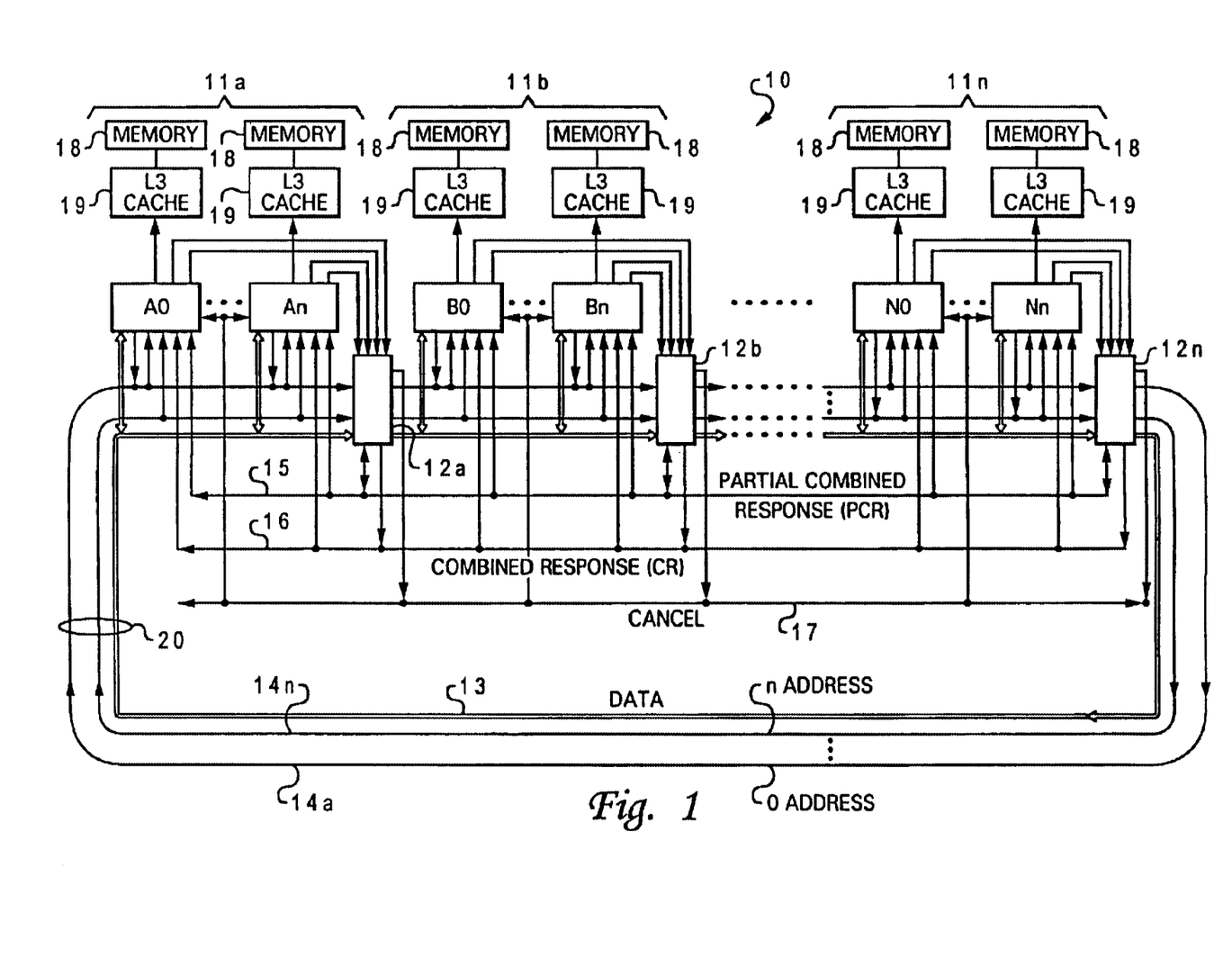
FIG. 1 is a block diagram of a multi-node data processing system, in accordance with a preferred embodiment of the present invention.

Referring now to the drawings and in particular to FIG. 1, there is depicted a block diagram of a multi-node data processing system, in accordance with a preferred embodiment of the present invention. As shown, a data processing system includes a number of nodes 11a–11n, which are coupled together in a ring configuration by a segmented interconnect 20 having one segment for each of nodes 11a–11n. Each of nodes 11a–11n of data processing system 10 includes one or more agents that are coupled to interconnect 20 and are designated A0–An for node 11a, B0–Bn for node 11b, etc. Each of nodes 11a–11n also includes a respective response and flow control logic 12 for controlling the flow of transactions on interconnect 20 to its neighboring node.

Interconnect 20 is configured to operate as a high-speed, high-bandwidth bus, preferably operating at a frequency in the order of 500 Mhz or higher. Interconnect 20 includes at least one data channel 13 and several non-blocking address channels 14a–14n that are each associated with a respective one of nodes 11a–11n such that only agents within an associated one of nodes 11a–11n can issue requests on one of address channels 14a–14n. Each of address channels 14a–14n and data channel 13 is segmented, as noted above, such that each of nodes 11a–11n contains a segment of each address and data channel, and each address and data channel segment is coupled to at least two neighboring segments of the same channel. As indicated by arrows, each channel is also uni-directional, meaning that address and data transactions on interconnect 20 are only propagated between neighboring nodes in the indicated direction. In the illustrated embodiment, each segment of each of address channels 14a–14n is implemented as an address bus that conveys 32 address bits in parallel, and each segment of data channel 13 is implemented as a data bus that conveys 16 data bytes in parallel; however, it will be appreciated that individual segments of interconnect 20 can alternatively be implemented with switch-based or hybrid interconnects.

In conjunction with interconnect 20, data processing system 10 has three sideband channels, namely, a partial combined response (PCR) channel 15, a combined response (CR) channel 16, and a cancel channel 17, to respectively communicate partial combined responses, combined responses, and a cancel (or stomp) signal. As utilized herein, a PCR is defined as a cumulative response to a request of all agents within fewer than all nodes, and a CR is defined as a cumulative response to a request by all agents in all nodes. As discussed further below, agents are able to determine by reference to the PCR, CR, and cancel signal associated with a request snooped on any one of address channels 14a–14n whether or not to service the request.

Figure 2:
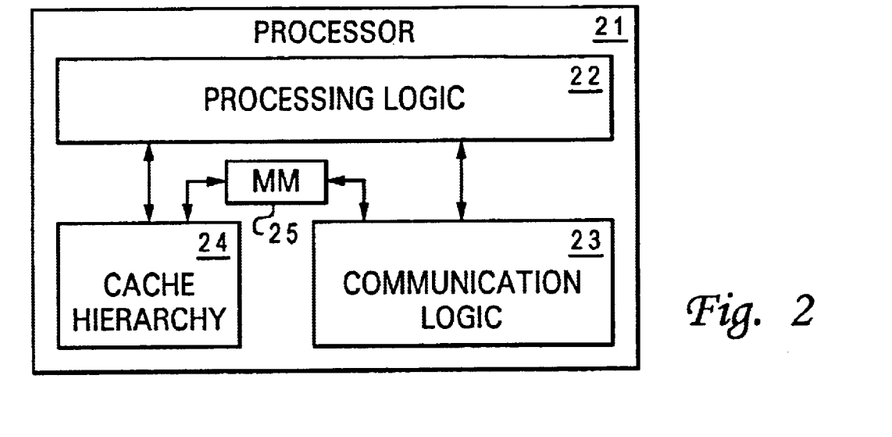
FIG. 2 is a block diagram of a processor that can be utilized to implement any agent within the data processing system from FIG. 1, in accordance with a preferred embodiment of the present invention.

With reference now to FIG. 2, there is depicted a block diagram of a processor that can be utilized to implement any agent within data processing system 10 from FIG. 1, in accordance with a preferred embodiment of the present invention. Although each agent within data processing system 10 can be implemented with a processor, it should be understood that an agent can be any device capable of supporting the communication protocol described herein. As shown, a processor 21 includes a processing logic block 22 for processing instructions and data, a communication logic block 23 for implementing a communication protocol that governs communication on interconnect 20 (from FIG. 1), and a cache hierarchy 24 for providing local, low latency storage for instructions and data. In addition to cache hierarchy 24, which may include, for example, level one (L1) and level two (L2) caches, the local storage of processor 21 may include an associated off-chip level three (L3) cache, such as L3 caches 19 and local memories 18, as shown in FIG. 1. Instructions and data are preferably distributed among local memories 18 such that the aggregate of the contents of all local memories 18 forms a shared "main memory" that is accessible to any agent within data processing system 10. Hereinafter, local memory 18 containing a storage location associated with a particular address is said to be the home local memory for that address, and the agent interposed between the home local memory and interconnect 20 is said to be the home agent for that address. As shown in FIG. 2, each home agent has a memory map 25 accessible to communication logic 23 and cache hierarchy 24 that indicates only what memory addresses are contained in the associated local memory 18.

Figure 3:
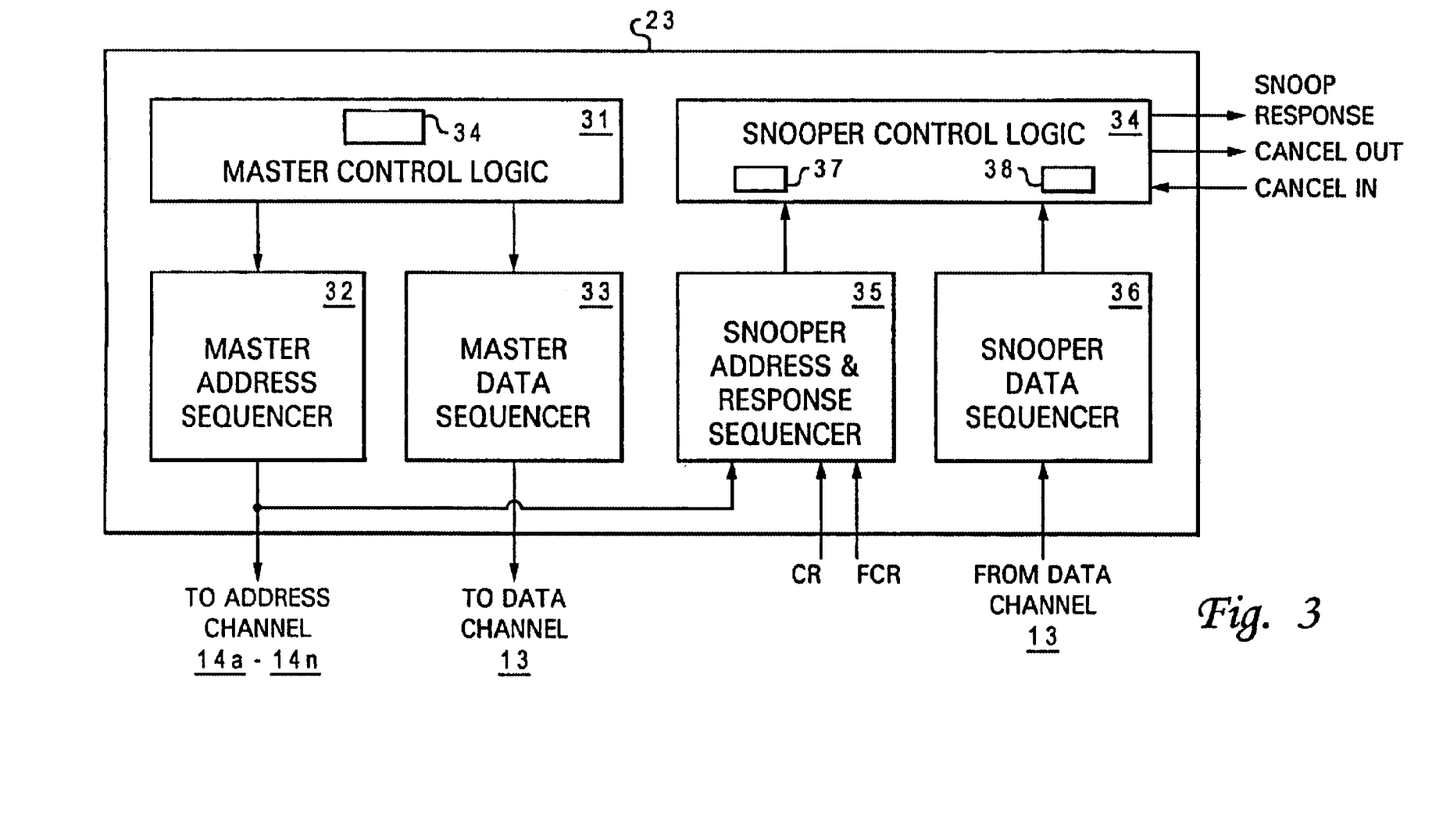
FIG. 3 is a block diagram of a communication logic block within the processor from FIG. 2, in accordance with a preferred embodiment of the present invention.

Referring now to FIG. 3, there is illustrated a detailed block diagram of communication logic 23 from FIG. 2. As illustrated, communication logic 23 includes a master control logic block 31, a master address sequencer 32 for sourcing request (address) transactions on one of address channels 14a–14n (from FIG. 1), and a master data sequencer 33 for sourcing data transactions on data channel 13. In order to ensure that each of address channels 14a–14n is non blocking, master address sequencer 32 of each agent within a given node 11 is connected to only address channel 14 associated with its node 11. Thus, for example, master address sequencer 32 of each of agents A0–An is connected to only address channel 14a, master address sequencer 32 of each of agents B0–Bn is connected to only address channel 14b, and master address sequencer 32 of each of agents N0–Nn is connected to only address channel 14n. To fairly allocate utilization of address channels 14a–14n and ensure that local agents do not issue conflicting address transactions, some arbitration mechanism (e.g., round robin or time slice) should be utilized to arbitrate between agents within the same node 11.

By contrast, master data sequencers 33 of all agents within data processing system 10 are connected to data channel 13. Data channel 13 is non-blocking since the types of data transactions that may be conveyed by data channel 13, which predominantly contain (1) modified data sourced from an agent other than the home agent, (2) data sourced from the home agent, and (3) modified data written back to a home local memory 18, are statistically infrequent for applications in which the distribution of memory among local memories 18 and the distribution of processes among the agents is optimized. Of course, in implementations including only a single data channel 13, some arbitration mechanism (e.g., round robin or time slice) should be utilized to arbitrate between agents within the same node 11 to ensure that local agents do not issue conflicting data transactions.

Master control logic 31 also includes a write counter 39. The purpose of write counter 39 is for incrementing a write counter field within a request transaction before the request transaction is sent. Details of the write counter field will be further described infra.

Communication logic 23 also includes a snooper address and response sequencer 35 coupled to each of address channels 14a–14n and to sideband response channels 15 and 16, a snooper data sequencer 36 coupled to data channel 13, and snooper control logic 34 connected to snooper address and response sequencer 35 and to snooper data sequencer 36. In response to receipt of a request transaction by snooper address and response sequencer 35 or a data transaction by snooper data sequencer 36, the transaction is passed to snooper control logic 34. Snooper control logic 34 processes the transaction in accordance with the implemented communication protocol and, if a request transaction, provides a snoop response and possibly a cancel signal to its node's response and flow control logic 12. Depending upon the type of transaction received, snooper control logic 34 may initiate an update to a directory or data array of cache hierarchy 24, a write to local memory 18, or some other action. Snooper control logic 34 performs such processing of request and data transactions from a set of request queues 37 and data queues 38, respectively.

Figure 4:
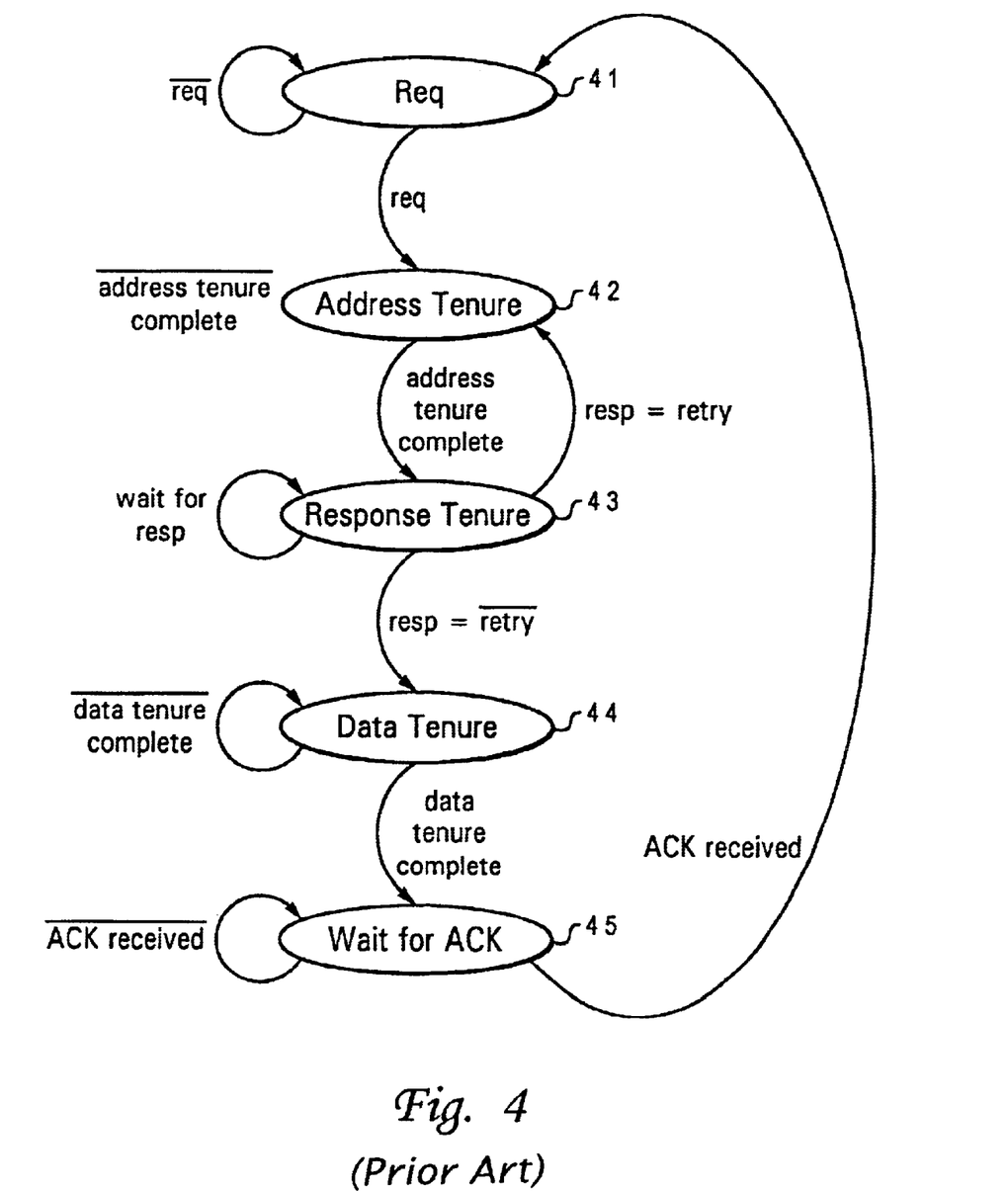
FIG. 4 is a state diagram of a request transaction in the data processing system from FIG. 1, according to the prior art.

With reference now to FIG. 4, there is depicted a state diagram of a request transaction in data processing system 10 (from FIG. 1), according to the prior art. As shown in step 41, a request transaction is initiated by a master agent, for example, agent A0 of node 11a, mastering a read or write request transaction in an associated address channel, such as address channel 14a. The request transaction propagates sequentially from node 11a to node 11b and eventually to node 11n via address channel 14a. After the snooper address and response sequencer 35 of each agent snoops the request transaction on address channel 14a, as depicted in step 42, the request transaction is forwarded to a corresponding snooper control logic, such as snooper control logic 34, which provides to an associated response and flow control logic, such as response and flow control logic 12, an appropriate snoop response indicating whether that agent can service (or participate in servicing) the request, as shown in step 43. Possible snoop responses are listed in Table I in order of descending priority.

TABLE I

| Snoop response | Meaning |
| --- | --- |
| Retry | retry transaction |
| Modified intervention | agent holds requested line in a modified state in cache from which data can be sourced |
| Shared intervention | agent holds requested line in a shared state from which data can be sourced |
| Shared | agent holds requested line in a shared state in cache |
| Home | agent is home agent of request address |
| Null | agent does not hold the requested line in cache and is not the home agent |

The snoop responses of agents A0–An are then combined by response and flow control logic 12a into a PCR output on PCR channel 15. If during a determination of the appropriate snoop response, snooper control logic 34 of an agent within node 11a determines that it is likely to have the highest priority snoop response of all agents within data processing system 10, for example, Modified Intervention for a read request or Home for a write request, the agent within node 10a asserts its cancel signal to a local cancellation logic (not shown), which outputs a cancel signal on cancel channel 17. The cancel signal is preferably asserted on cancel channel 17.

Subsequently, node 11a sends a packet of data associated with the request to a receiving node that can service the request, as shown in step 44, and node 11a then waits for an acknowledgement (ACK) signal from the receiving node before sending another packet of data, as depicted in step 45. Each packet of data is associated with a tag. Node 11a must wait for the ACK signal from the receiving node because if node 11a sends a new packet of data right away, all nodes that are ready to receive data could see multiple uses of the same tag and cannot distinguish one packet of data from the other. However, the wait time for the ACK signal can be very long due to blocking/stalling along an interconnect, such as interconnect 20.

For example, a tag Y is used by an L2 cache for casting out data from a buffer within node A0 to node M0. Once the data is unloaded from node A0, the data can be stalled downstream on its way to node M0 due to traffic within an interconnect connected between node A0 and node M0. In the meantime, it is foreseeable that same castout buffer within node A0 may issue another address tenure with the same tag Y, but this time the data is destined for node N0. So, if the data from the first castout has not been received by node M0 before the second castout, the recipients of data on node M0 and N0 will not be able to distinguish for which node the castout data packet is intended. Thus, in the prior art, the castout buffer within node A0 is not allowed to reset and start again until an ACK signal (address-only tenure) is received by node A0 indicating that the intended destination of the castout data actually received the castout data packet. However, the wait time for the ACK signal can be very long due to blocking/stalling along the interconnect. Such problem is exacerbated in a really large processing system having many nodes due to the increasing chances of data bus stalling and the time it takes to transfer data across the processing system.

Figure 5A:
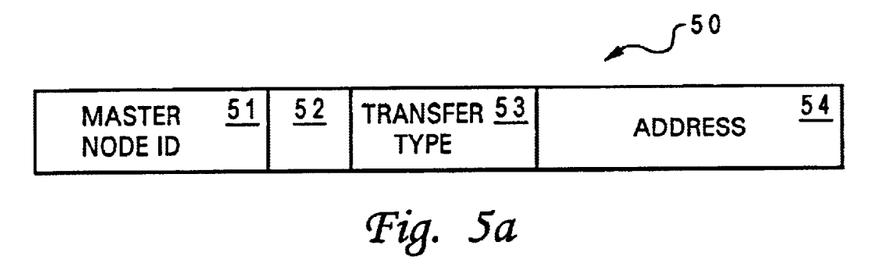
FIG. 5a depicts an exemplary format of a request transaction transmitted via an address channel of the data processing system from FIG. 1.
Figure 5B:
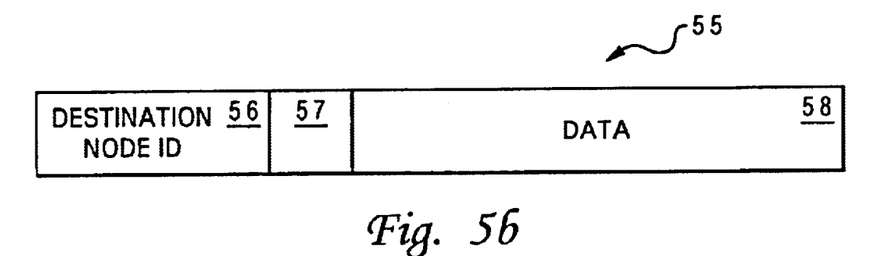
FIG. 5b depicts an exemplary format of a data transaction transmitted via a data channel of the data processing system from FIG. 1.

In order to avoid the wait time, a new request transaction according to the present invention is used. Referring now to FIG. 5a, there is depicted a data structure of a request transaction in accordance with a preferred embodiment of the present invention. As shown, a request transaction 50 contains a master node ID field 51 for indicating the node ID of the master agent, a write counter field 52, a transaction type field 53 for indicating whether the request transaction is a read (e.g., read-only or read-with-intent-to-modify) or write request, and a request address field 54 for specifying the request address. FIG. 5b depicts a similar data structure of a data transaction 55, which data transaction 55 contains a destination node ID field 56 for indicating the node ID of the destination node, a write counter field 57, and a data field 58 for containing the data.

In accordance with a preferred embodiment of the present invention, the number within write counter fields 52 and 57 are incremented by one each time a transaction request is sent. For example, the number within write counter field 52 for a first request transaction is "00," the number within write counter field 52 for a second request transaction is "00," the number within write counter field 52 for a third request transaction is "10," and the number within write counter field 52 for a fourth request transaction is "11." Then, the number within write counter field 52 for a fifth request transaction will be returned to "00."

The number of bits within write counter field 52 preferably depends upon the number of nodes and the delays in an interconnect connecting all nodes within a data processing system. For example, the number of nodes within the data processing system $=2^n$, where n is the number of bits within write counter field 52. Thus, n=$\log_{10}$(number of nodes within said data procesing system)/$\log_{10}2$. As such, the number of bits within write counter field 52 may be adjusted to provide an optimal performance according to the length of the interconnect, such as interconnect 20 in FIG. 1. The number of bits within write counter field 52 is preferably updated by a write counter, such as write counter 39 from FIG. 3.

Figure 5C:
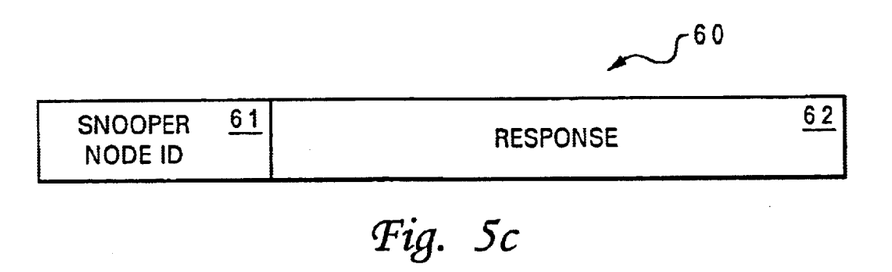
FIG. 5c depicts an exemplary format of a partial combined response or combined response transmitted via a response channel of the data processing system from FIG. 1.

As indicated in FIG. 5c, the data structure of a response 60 includes a snooper node ID field 61 for indicating the node ID of the agent that provides the highest priority snoop response yet received, and a response field 62 for indicating the highest priority snoop response yet received.

Figure 6:
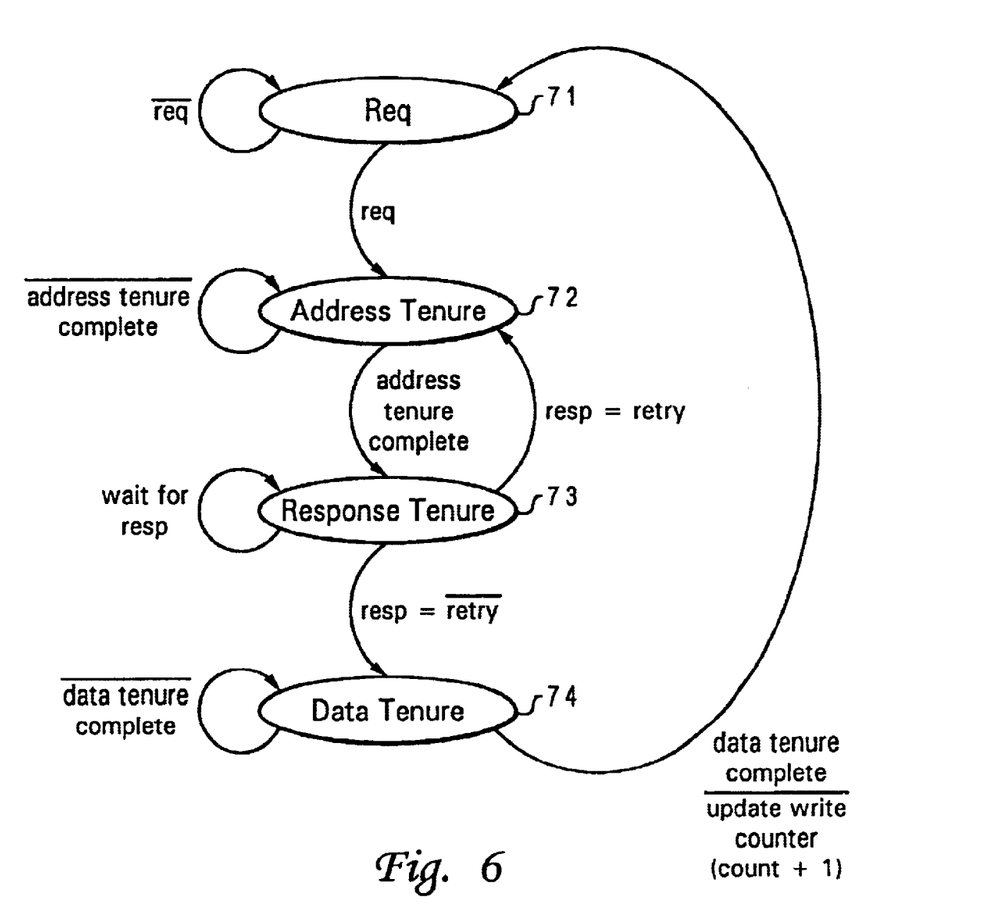
FIG. 6 is a state diagram of a request transaction in the data processing system from FIG. 1, in accordance with a preferred embodiment of the present invention.

With reference now to FIG. 6, there is depicted a state diagram of a request transaction in data processing system 10 (from FIG. 1), in accordance with a preferred embodiment of the present invention. A request transaction, such as a read or write, is initiated by a master agent within a first node, as shown in step 71. The address of the request transaction propagates sequentially from one node to another, as depicted in step 72. The master agent then waits for a response from one of the receiving nodes, as shown in step 73. After the receipt of a response, data is sent from the master agent to the intended receiving node that had sent the response, as depicted in step 74. Upon the completion of the data tenure, the write counter field (such as write counter field 52 from FIG. 5a) of the next request transaction is incremented by one such that the next request transaction will have a higher write count than the previous request transaction. Then, the process can proceed to the next request state, repeating the sequence of FIG. 6, without waiting for an ACK signal from the intended receiving node, as it is done in the prior art design.

As has been described, the present invention provides a method and apparatus for transmitting packets within a symmetric multiprocessor system. The present invention removes the tagging problem by differentiating the tag each time a given buffer is used. Therefore, the buffer can be reused right after unloading the data packet on the bus. By using the write counter of the present invention, the long wait time of re-using the same tag can be avoid, and the number of queues (such as a cast-out buffer) within a node for storing data ready to be sent can be potentially reduced.

While the invention has been particularly shown and described with reference to a preferred embodiment, it will be understood by those skilled in the art that various changes in form and detail may be made therein without departing from the spirit and scope of the invention.

What is claimed is:

1. A method for transmitting packets among processing nodes within a data processing system, wherein said data processing system includes a plurality of processing nodes connected to each other via an interconnect, said method comprising:

initiating a request transaction from a master node to a plurality of receiving nodes;

generating a write counter number to be associated with said request transaction;

receiving a combined response from said receiving nodes by said master node;

sending a data packet from said master agent to an intended one of said receiving nodes according to said combined response; and initiating a new request transaction, along with a new write counter number, immediately after said data packet has been sent and before the receipt of an acknowledgement from said intended receiving node.

2. The method of claim 1, wherein said generating step further includes generating a new write counter number for each request transaction.

3. The method of claim 1, wherein a number of bits within said write counter number=$\log_{10}$(number of nodes within said data processing system)/$\log_{10} 2$.

4. The method of claim 1, wherein said data processing system is a symmetric multiprocessor system.

5. An apparatus for transmitting packets among processing nodes within a data processing system, wherein said data processing system includes a plurality of processing nodes connected to each other via an interconnect, said apparatus comprising:

means for initiating a request transaction from a master node to a plurality of receiving nodes;

means for generating a write counter number to be associated with said request transaction;

means for receiving a combined response from said receiving nodes by said master node;

means for sending a data packet from said master agent to an intended one of said receiving nodes according to said combined response; and means for initiating a new request transaction, along with a new write counter number, immediately after said data packet has been sent and before the receipt of an acknowledgement from said intended receiving node.

6. The apparatus of claim 5, wherein said generating means further includes a write counter for generating a new write counter number for each request transaction.

7. The apparatus of claim 5, wherein a number of bits within said write counter number=$\log_{10}$(number of nodes within said data processing system)/$\log_{10} 2$.

8. The apparatus of claim 5, wherein said data processing system is a symmetric multiprocessor system.

* * * * *

UNITED STATES PATENT AND TRADEMARK OFFICE
CERTIFICATE OF CORRECTION

PATENT NO. : 6,910,062 B2
DATED : June 21, 2005
INVENTOR(S) : Arimilli et al.

It is certified that error appears in the above-identified patent and that said Letters Patent is hereby corrected as shown below:

Column 7,
Lines 19-21, should read -- sending a data packet from said master node to an intended one of said receiving nodes according to said combined response; and --.

Column 8,
Lines 15-17, should read -- means for sending a data packet from said master node to an intended one of said receiving nodes according to said combined response; and --.

Signed and Sealed this

Fourteenth Day of February, 2006

JON W. DUDAS
*Director of the United States Patent and Trademark Office*